United States Patent [19]

Haas et al.

[11] 4,239,969

[45] Dec. 16, 1980

[54] ARTICLE INSPECTION APPARATUS WITH PROTECTIVE CHAMBER HAVING ARTICLE-LOADING FACILITY

[75] Inventors: David J. Haas, Suffern; Nick Galetta, Yonkers; Adolf Juner, City Island, all of N.Y.

[73] Assignee: North American Philips Corporation, New York, N.Y.

[21] Appl. No.: 961,434

[22] Filed: Nov. 16, 1978

[51] Int. Cl.³ ............................................. G01N 23/00
[52] U.S. Cl. ................................... 250/359; 250/453; 250/492 R
[58] Field of Search ........ 250/358, 359, 368, 416 TV, 250/490, 492 R, 453

[56] References Cited

U.S. PATENT DOCUMENTS

| | | | |
|---|---|---|---|
| 3,018,375 | 1/1962 | Graves et al. | 250/368 |
| 3,808,444 | 4/1974 | Schneeberger et al. | 250/492 R |
| 4,020,346 | 4/1977 | Dennis | 250/453 |

Primary Examiner—Bruce C. Anderson
Attorney, Agent, or Firm—Thomas A. Briody; Robert T. Mayer; Paul R. Miller

[57] ABSTRACT

An article inspection apparatus comprising chamber defining means that are substantially impermeable to x-rays. The chamber defining means comprise a first portion comprising entry and exit portions and a second portion located between the entry and exit portions. Also included is an x-ray source for directing x-rays to the chamber at said second portion and flexible x-ray shielding means disposed at the entry and exit portions, the entry and exit portions both comprise respective first and second regions, the first regions being removed from the chamber second portion and the second regions being located between the second portion and their respective said first regions. The second regions comprise completely enclosed tunnels communicating with the second portion and with the first regions. The first regions comprise top and partial side wall members, which side wall members have a cutaway at the end thereof more remote from the second portion. The apparatus also contains an article transport system having a first part thereof disposed at the chamber second portion and at least a second part thereof disposed at the first chamber portion, which article transport system serves to carry the article through the chamber second portion. Also included are means for converting the x-rays passing through the chamber first portion and the article, into a visual image.

23 Claims, 7 Drawing Figures

ARTICLE INSPECTION APPARATUS WITH PROTECTIVE CHAMBER HAVING ARTICLE-LOADING FACILITY

BACKGROUND OF THE INVENTION

The present invention relates to apparatus for inspecting various articles, including containers, particularly of such a type lending itself to luggage and container inspection.

The recent high incidences of aircraft hijackings, theft, terrorist bombings, and other unlawful acts have prompted and necessitated the development of inspection systems for locating weapons, contraband, and other articles hidden in luggage so as to thwart such acts. Such systems generally have involved the use of x-rays but this leads to problems of shielding personnel and others from radiation. These problems also exist in various apparatus for inspecting various articles other than luggage.

Many prior art x-ray apparatus employed for inspecting various articles require the use of enclosing structures to prevent the escape of x-rays from the apparatus into the surrounding area and the consequent possibility of the irradiation of persons in this area by the escaping x-rays. Such enclosing structures can be x-ray impermeable hanging doors, telescoping doors, or other suitable, relatively rigid parts.

Another type of x-ray apparatus utilizes flexible curtains that are x-ray impermeable, one variety of such curtains being in the form of hanging strips of lead-containing flexible material.

By federal regulatory agency requirements, x-ray apparatus of the above type are required to have a certain minimum distance between the entry and exit ports of the machine and the x-ray beam, so as to avoid the possibility of a person inadvertently thrusting his arm or another part of his body into the x-ray beam.

To meet the federal safety requirements, the presently known versions of x-ray inspection apparatus provide for an outer envelope whose openings for inserting and removing the various inspected articles, are located such that they are at a minimum specified distance (presently 36 inches) from the fringes of the primary x-ray beam. Such an apparatus includes two tunnels located between the path of the x-ray beam and, respectively, the article entry and exit ports, such tunnels being completely closed on all sides, and a conveyor belt extending from the entry port, through the vicinity of the x-ray beam, to the exit port. Where the conveyor belt is co-extensive with the tunnels, the articles for inspection are required to be inserted into the tunnel, requiring some manipulation, so, to avoid this disadvantage, the apparatus is constructed so that the conveyor belt extends for considerable distances beyond the entry and exit ports. However, this type of structure is undesirable because of the resulting greater size and cost of the apparatus.

The present invention seeks to overcome this disadvantage and to provide other benefits as well.

PREFERRED EMBODIMENTS

Figure 2:
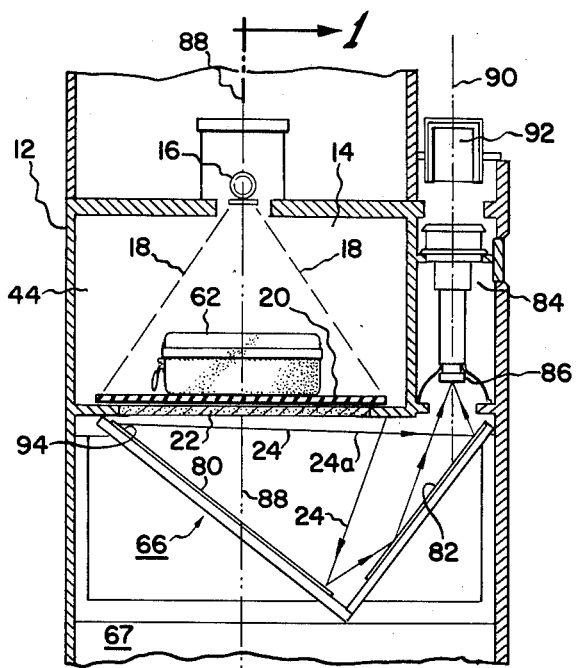
FIG. 2 is a sectional elevation view of the apparatus of FIG. 1, taken along axis 2—2.
Figure 1:
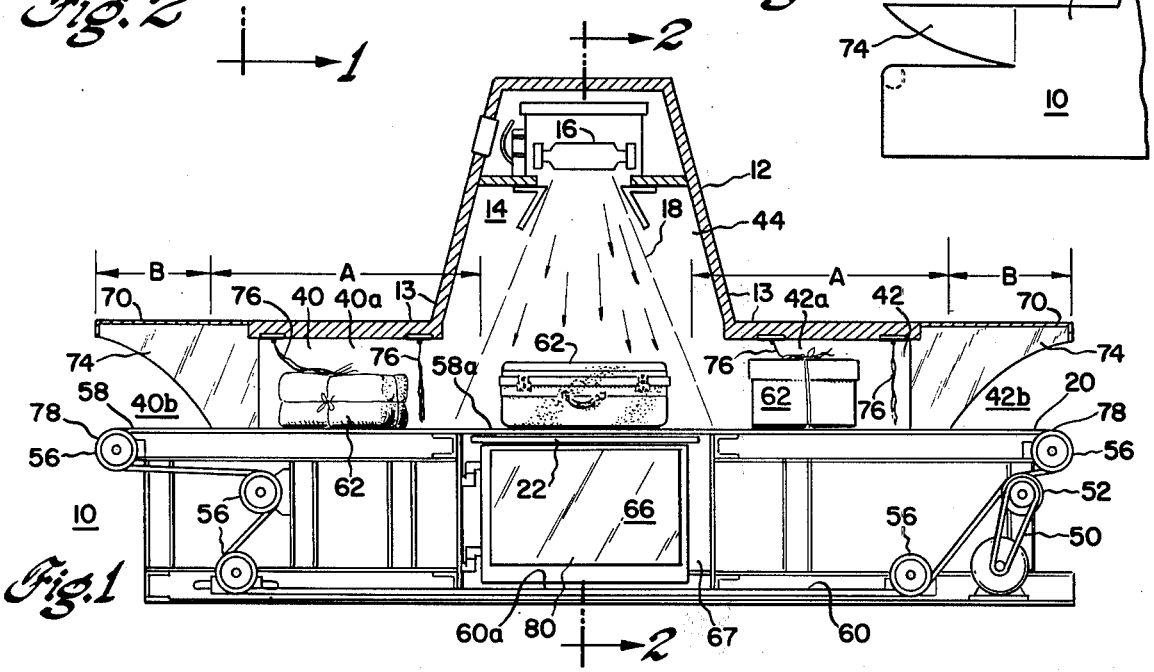
FIG. 1 is a sectional elevation view schematically representing the apparatus of the present invention according to a preferred embodiment.

According to a preferred embodiment, the present invention comprises an apparatus 10 (FIG. 1) including a substantially x-radiation impermeable structure 12 (e.g. a lead-lined housing or cabinet 13 and shielding means 76 described below) that defines an interior chamber 14, an x-ray source 16 for providing an interruptible x-ray beam 18 in a determined direction, as described below, a conveyor system including a conveyor 20, fluorescent screen means 22 located so as to receive the x-ray beam 18 and adapted to convert x-radiation into visible radiation 24 (FIG. 2), and an imaging system 66 for transmitting the visible radiation 24 to a viewer.

The interior chamber 14 comprises entry and exit tunnel regions 40 and 42, respectively, and a central space 44 intermediate thereto. The conveyor belt 20 is endless and can be driven by, for example, a motor-driven chain drive system 50 that turns a pulley 52 which is connected to a drive roller element, the conveyor belt 20 being mounted on the various guide rollers 56 so that the upper and lower portions 58, 60 of the conveyor belt 20 are spaced apart by an appreciable distance, i.e., a distance significantly greater than the diameter of a guide roller 56, at at least the parts 58a, 60a of the conveyor belt 20 that pass, in the operation of the apparatus 10, through the central space 44.

At the central space 44, preferably between the upper and lower portions 58, 60 of the conveyor belt 20, there is located the fluorescent screen 22, which is in the path of the x-ray beam 18 and receives the x-rays that pass through the article, e.g. luggage 62, and through only a single layer of the conveyor belt 20, i.e., through the part 58a of the upper portion 58.

The fluorescent screen means 22 converts the x-ray beam into visible light, the x-ray being modulated or attenuated by, for example, any metallic objects or other objects that might be present in the luggage or other container 62 as the beam passes through the luggage or container. The beam portion reaching the fluorescent screen 22 carries a latent image of the metallic or other objects, which image is reproduced into visible radiation by the fluorescent screen 22, the visible image being directed to an imaging system 66 (FIGS. 1 and 2) disposed at a portion 67 of the central space 44 below the fluorescent screen so as to receive the visible image.

According to a preferred embodiment of the invention, each of the tunnels 40, 42 enclosing respective passageways, comprises a first portion 40a and 42a, respectively, that is located adjacent the central chamber 44 and a second portion 40b and 42b, respectively, that is disposed more remote from the center chamber 44, the parts 40a and 42a, and the parts 40b and 42b generally being co-extensive with the parts of the apparatus 10 indicated by A and B, respectively. The first portions 40a and 42a are closed on all sides (including the top) by the x-ray impermeable walls of the tunnels 40, 42, with the ends open. The second portions 40b and 42b have their ends open but are only partly enclosed by the x-ray impermeable walls, it being more preferred that there be at least top walls 70 that project out in cantilever fashion from their respective first portions 40a, 42a for the entire length of the second portions 40b, 42b. It is desirable that at least a portion of the top walls 70, (and, where sought, at least a portion of the side walls at the second portions 40b, 42b) be of transparent material, such as plastic.

Figure 3:
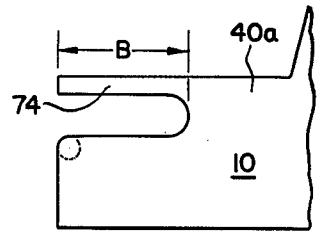
FIGS. 3-7 are fractional side elevation views schematically representing further embodiments of the present invention, the apparatus shown in these figures being similar to that of FIG. 1, except for the profile of a part of the side walls (corresponding parts being similarly numbered).
Figure 4:
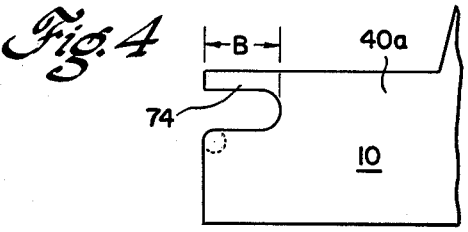
Figure 5:
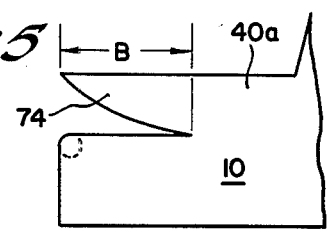
Figures 6, 7:
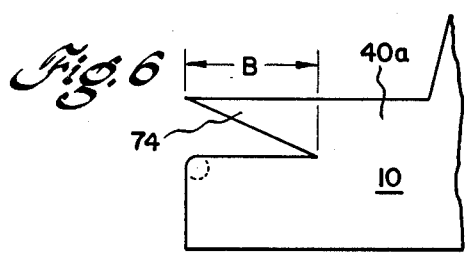

The second portions 40b and 42b can (and, often it is preferred that they do) have side wall elements 74 (on both side of each tunnel 40,42) that enclose only a part of the space between the top walls 80 and the conveyor belt 20. Thus, there are located at the second portions 40b, 42b only partial side walls. Such a preferred side wall can have the cutback shape shown in FIG. 1 (which has a general profile of half a U) or some other suitable configuration, e.g., generally a U-shape, (FIGS. 3 and 4, FIG. 3 being a full U and FIG. 4 being between a half and a full U-shaped profile generally). It is important that there be at most, only part of a side wall at the mouth of the second portion so that the end part of the conveyor is accessible for loading and unloading the inspected articles. Therefore, the side wall elements 74 should have a profile that moves downward in moving toward the central space 44. It is further preferred that the top wall elements 70 of the second portions 40b, 42b of the respective passageways 40, 42 be located, generally, at or below shoulder height of an adult of average stature, it being more preferred that same be at or below chest level so as to preclude a person's unintentionally inserting a part of his body in the x-ray beam. Where it is desired, the side wall elements of the apparatus can have other configurations, such as, for example, the convex profile shown in FIG. 5, or the triangular profile shown in FIG. 6, in both of which figures the side wall element 74 encloses only a part of the space at the second portion 40b. The apparatus can have a second portion (FIG. 7) whose side wall elements partially enclose the space at the second portion, which side walls extend downward in the direction toward the central space but extend down only over a part of the height of the second portion instead of extending down over the entire such height.

In the above arrangement, the first portions 40a and 42a act to contain stray radiation that emanates from the central chamber, there preferably being located within the first portions 40a and 42a plural, e.g., two, curtains 76 of flexible radiation proof material, such curtains covering the entire cross-sectional area of the first portions 40a, 42a of the tunnels and being spaced apart by a distance substantially equal to the longest dimension of the inspected articles (so that at least one curtain is down and blocking any stray radiation, when the articles pass through the tunnel).

The provision to the second portions 40b, 42b of side walls, if any, having at least a part, and, preferably, a major part or even all of, their lower portions cut away, so that there is, at most, only a partial side wall, exposes the end regions 78 of the conveyor belt, thus facilitating the loading and unloading of the inspected articles thereon. While such loading and unloading of articles on the present apparatus is not as easy as doing same on a completely open conveyor, it is, nevertheless, considerably simpler that doing so where the tunnel completely encloses the conveyor. In the case where the conveyor is open completely at the loading and unloading points, as in the prior art, its length has to be greater than the present apparatus in order to achieve substantially the same degree of radiation safety. Hence, the present invention provides a very desirable combination of features of facile loading and unloading and radiation safety with a considerably shorter apparatus that provides lower weight and cost. In come instances, it may be desirable to have a second portion having partial side walls (such as that labeled as "B" in the figures) at only the entry or exit area of the apparatus with the other such area having, e.g., a completely closed tunnel structure. It is generally preferred that the side walls of the second portions be such that, at their lower parts, there be accessible for loading and unloading a substantial part, and even at least a major part, of that portion of the conveyor belt located between the end of the conveyor 20 and the fringe of the radiation leakage boundary. In the embodiment shown in FIG. 1, the accessible part of the conveyor is approximately that extending over the region indicated B.

While it is preferred that the cut-away side wall element of the present apparatus (which provides with the other walls of the regions labeled at "B", a physical barrier to prevent insertion of a person's arms, etc., into the radiation zone "A") be coextensive with the tunnel second portions (B), that comprise the tunnel length beyond the radiation zones (A), so as to minimize the length of the apparatus, the second portions (B) may, if desired, be longer than the cut-away side wall element.

In the x-ray optical system of the apparatus 10, for examining an article, the x-ray source 16 is directed in a generally downward first direction and the fluorescent screen means 22 for converting the x-rays to a light image is disposed below the x-ray source. The article 62 passes between the x-ray source 16 and the fluorescent screen means 22 such that x-rays passing through the article reach the screen 22 to generate thereat a light image of the article. The imaging system 66 comprises a first light-reflecting means, or mirror 80, disposed generally below the fluorescent screen 22 so as to receive the light image from the fluorescent screen 22, the light image moving generally in the first direction. A second light-reflecting means, or mirror 82, is disposed opposite and obliquely to the first light-reflecting means, so as to receive the light image reflected from the first light-reflecting means and to redirect the light image in a generally upward second direction and means for viewing the light image are disposed above the second light-reflecting means.

The apparatus 10 further includes an optical system 84 that comprises an objective lens 86 and can include an image intensifier of a type known to the art. The x-ray source 16 and fluorescent screen 22 are located on a first axis 88, while the optical system 84 is located on a second axis 90, the first and second axes 88 and 90, respectively, being substantially parallel to each other and substantially vertical, it being preferred that the axes be parallel and vertical.

The first and second radiation-reflecting members or mirrors 80, 82 respectively, e.g., objective mirrors, are disposed obliquely to each other and the first reflecting member 80 is disposed at the first axis 88 so as to receive a radiation image from the fluorescent screen 22 and reflect it toward the second reflecting member 82, which is disposed at the second axis 90. It is generally preferred that the reflecting members 80, 82 be front surface mirrors, which can reflect the radiation image directly from the reflecting layer of the mirrors without the image passing through the transparent layer of the mirrors to reach the reflecting layer and then passing through the transparent layer onece again after the reflection thereof.

The second reflecting member 82 is located so as to receive the radiation image from the first reflecting member 80 and direct the image toward the optical system 84. It is generally preferred that the first and second reflecting members 80, 82 be disposed at substantially right angles to each other, with both located in the chamber 66 together with the fluorescent screen 22. The fluorescent screen 22 can be carried by the housing 12, it being preferred that the screen 22 comprise a layer of x-ray permeable material facing the x-ray source 16 and that a layer of fluorescing material be located at the screen side more remote from the x-ray source 16.

It can be seen that the above arrangement has a generally U-shaped profile, with a result being a more squat structure, thus facilitating the observation of the visible image of the inspected article. This compares quite favorably with the above-described prior art devices, whose various component parts are located on a single axis or on two axes that generally are perpendicular to each other.

It is especially preferred that the first reflecting member 80 be disposed near to the fluorescent screen 22, the position of the second reflecting member 82 with respect to the first member 80 being in accordance with the foregoing description, but, nevertheless, it being preferred that the optical system 84 be disposed near to and above the second reflecting member 82.

Particularly preferred is a source 16 that provides a wide-angle x-ray beam 18, e.g., one having an angle of about 60° or greater. It is generally preferred that the optical system comprise a light reflector or mirror 92 that is disposed so as to receive and reflect to the viewer the light image of the article to be inspected. The mirror 92 can be pivotably mounted, e.g., on a gimble, to permit it to be adjusted. Where it is desired, a television camera or other device can be incorporated in the apparatus 10, to permit remote position viewing. Where the image is to be viewed directly, the mirror 92 can be (and preferably is) located at a level that is comfortable to the average individual, this being greatly facilitated by the present invention.

In the operation of the apparatus, the generated x-ray beam 18 travels from the source 16 to the fluorescent screen, and passes through the article 62 that is to be inspected. The real time visible x-ray image of the article 62 is converted to a visible image by the fluorescent screen 22, the visible image passing through the screen 22 and reaching the first reflecting member 80, by which it is directed toward the second reflecting member 82. The reflected visible image is then again reflected by the second reflecting member 82 and directed by the latter toward the optical system 84 and is viewed on the mirror 92.

It is preferred that the first reflecting member 80 be obliquely disposed with respect to the fluorescent screen 22 (e.g., that they form an acute angle, of, for example, 45°) and that the upper end 94 of the first reflecting member be near or next to the fluorescent screen 22. A desired result is that the rays of light 24a reflected by the first reflecting member 80 and located nearest the fluorescent screen 22, travels toward the second reflecting member 82 along a path that is substantially parallel to the adjacent fluorescent screen 22.

The reflecting members 80, 82 should be sufficiently large to intercept fully the largest image that is expected to be produced with this apparatus 10.

According to a preferred embodiment of the invention, the optical system has a distant focus, i.e., a focal point of about three feet or more from the operators' normal eye position, which is about the location of the viewing mirror 92. This permits a significant reduction in the viewers eye fatigue and permits observation of the image at a relatively close distance.

The x-ray source 16 can be a standard industrial x-ray tube, e.g., an x-ray tube sold by Amperex under the trademark RI-80, which can be operated in the range of 60 to 100 KV., and the fluorescent screen 22 can be a standard industrial fluorescent screen, such as that sold under the Dupont trademark E-2.

The claims are as follows:

1. An article inspection apparatus capable of continuous operation for at least part of the operating time thereof, comprising:
    (a) chamber defining means that are substantially impermeable to x-rays and that comprise a first portion comprising entry and exit portions and a second portion located between said entry and exit portions;
    (b) an x-ray source for directing x-rays to the chamber at said second portion of said means;
    (c) flexible x-ray shielding means disposed at said entry and exit portions;
    (d) said entry and exit portions both comprising respective first and second regions, said first regions being removed from said chamber second portion and said second regions being located between said second portion and their respective said first regions, said second regions comprising completely enclosed tunnels communicating with said second portion and with said first regions, said first regions comprising top and partial side wall members with said top wall members extending out for the entire length of said first regions, and said side wall members having a cutaway at the end thereof more remote from said second portion, said cutaway extending downwardly from said top wall toward said second region;
    (e) an article transport system having a first part thereof disposed at said chamber second portion and at least a second part thereof disposed at said first chamber portion, said article transport system serving to carry said article through said chamber second portion; and
    (f) means for converting said x-rays passing through said chamber second portion and said article into a visual image.

2. An inspection apparatus as in claim 1, wherein said cutaway has a profile that extends at least downwardly from an outer end of said top wall members in a direction toward said second portion.

3. An inspection apparatus as in claim 1, wherein said top walls of said first regions project out in cantilever fashion from said second regions.

4. An inspection apparatus as in claim 3, wherein said top walls extend over the entire length of said first regions.

5. An inspection apparatus as in claim 1, wherein at least part of said top walls is of transparent material.

6. An inspection apparatus as in claim 1, wherein at least part of said side walls of said first regions is of transparent material.

7. An inspection apparatus as in claim 1, wherein said side walls enclose only a part of the space between said top walls and said transport system.

8. An inspection apparatus as in claim 1, wherein said side walls have a cutaway portion whose profile generally is in the shape of a half "U".

9. An inspection apparatus as in claim 1, wherein said side walls have a cutaway portion whose profile generally is U-shaped.

10. An inspection apparatus as in claim 1, wherein said side walls have a cutaway portion whose profile generally is convex.

11. An inspection apparatus as in claim 1, wherein said side walls have cutaway portions whose profile generally is concave.

12. An inspection apparatus as in claim 1, wherein said side walls have a cutaway portion whose profile generally is triangular.

13. An inspection apparatus as in claim 1, wherein said side walls comprise cutaway portions that render accessible for loading and unloading of articles a substantial part of said conveyor system located between the end of said conveyor and said second regions.

14. An inspection apparatus as in claim 1, wherein said converting means comprises:
   (a) fluorescent screen means for converting said x-rays to a light image, said screen means being disposed below said x-ray source,
   (b) means for receiving said article located between said x-ray source and said fluorescent screen means, such that said x-rays passing through said article reach said screen means to generate thereat a light image of said article,
   (c) a first light reflecting means disposed generally below said fluorescent screen means so as to receive said light image from said fluorescent screen means, said light image moving generally in said direction,
   (d) second light reflecting means disposed opposite and obliquely to said first light reflecting means, so as to receive said light image reflected from said first light reflecting means and to redirect said light image in a generally upward second direction, and
   (e) means for viewing said light image, said viewing means being disposed above said second light reflecting means.

15. An inspection apparatus as in claim 14, wherein said viewing means comprises an image intensifier adapted to receive said image from said second reflective means.

16. An inspection apparatus as in claim 14, wherein said first and second directions are at least substantially parallel.

17. An inspection apparatus as in claim 14, wherein said first and second light reflecting means comprise mirrors.

18. An inspection apparatus as in claim 14, wherein said x-ray source; fluorescent screen means, first and second light reflecting means, and viewing means are disposed in a generally U-shaped arrangement.

19. An inspection apparatus as in claim 14, wherein said viewing means comprises a mirror element.

20. An inspection apparatus as in claim 19, wherein said mirror element is pivotably mounted.

21. An inspection apparatus as in claim 14, wherein said x-ray source, fluorescent screen means, and first light reflecting means are disposed substantially on a first axis and said second light reflecting means and viewing means are disposed substantially on a second axis, said first and second axes being substantially parallel and substantially vertical.

22. An article inspection apparatus according to claim 1, wherein said article transport system comprises a conveyor system having a conveyor belt moving in one direction through said x-ray chamber, and having said conveyor belt return at a position below said means for providing a visible image of said x-irradiated article.

23. An article inspection apparatus according to claim 1, wherein said second regions of said entry and exit portions both have flexible x-ray impermeable curtains at both the entrance and exit sections thereof, and wherein at least one of said curtains at each of said entrance and exit portions is closed upon moving said article through said x-ray chamber.

* * * * *